US012267822B2

(12) United States Patent
Chung et al.

(10) Patent No.: US 12,267,822 B2
(45) Date of Patent: *Apr. 1, 2025

(54) METHOD AND AND RECEIVING CONTROL SIGNAL FOR MERGING CARRIERS IN TRANSMISSION

(71) Applicant: LG Electronics Inc., Seoul (KR)

(72) Inventors: Jae Hoon Chung, Seoul (KR); So Yeon Kim, Seoul (KR); Sungho Moon, Seoul (KR); Seunghee Han, Seoul (KR); Yeong Hyeon Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

This patent is subject to a terminal disclaimer.

(21) Appl. No.: 17/575,987

(22) Filed: Jan. 14, 2022

(65) Prior Publication Data
US 2022/0141823 A1    May 5, 2022

Related U.S. Application Data

(63) Continuation of application No. 16/202,240, filed on Nov. 28, 2018, now Pat. No. 11,259,302, which is a
(Continued)

(51) Int. Cl.
*H04W 72/04* (2023.01)
*H04J 11/00* (2006.01)
(Continued)

(52) U.S. Cl.
CPC ..... *H04W 72/0453* (2013.01); *H04J 11/0069* (2013.01); *H04L 1/0038* (2013.01);
(Continued)

(58) Field of Classification Search
CPC ..... H04L 5/001; H04L 5/0053; H04L 1/0038; H04L 5/0094; H04L 5/0098;
(Continued)

(56) References Cited

U.S. PATENT DOCUMENTS 9,231,743 B2   1/2016  Chung ............... H04J 11/0069
9,231,746 B2   1/2016  Valentin ............. H04L 1/0026
(Continued)

FOREIGN PATENT DOCUMENTS

KR   10-2009-0033126 A    4/2009
WO   WO 2008-156348 A1   12/2008

OTHER PUBLICATIONS

R1-091202: 3GPP TSG RAN WG1 #56bis, Seoul, Korea, Mar. 23-27, 2009, LG Electronics, "HARQ process mapping across aggregated component carriers," (3 Pages).
(Continued)

*Primary Examiner* — Faisal Choudhury
(74) *Attorney, Agent, or Firm* — BRYAN CAVE LEIGHTON PAISNER LLP

(57) ABSTRACT

Embodiments of the present invention are directed to a method and apparatus for transmitting and receiving a control signal (for example, PDCCH signal) in an asymmetric multicarrier environment. The method for transmitting a control signal for an asymmetric multicarrier in a wireless connection system according to one embodiment of the present invention comprises: determining the size of a carrier indicator field (CIF) indicating a downlink component carrier (DL CC) by which downlink data is transmitted, on the basis of a maximum value of the number of DL CCs and of the number of uplink component carriers (UL CCs) being managed in a base station; transmitting the CIF on a $1^{st}$ DL CC to a terminal through a physical downlink control channel (PDCCH); and transmitting downlink data on a $2^{nd}$ DL CC indicated by the CIF to the terminal through a physical downlink shared channel (PDSCH).

14 Claims, 13 Drawing Sheets

Related U.S. Application Data continuation of application No. 15/594,125, filed on May 12, 2017, now Pat. No. 10,172,134, which is a continuation of application No. 14/956,759, filed on Dec. 2, 2015, now Pat. No. 9,668,260, which is a continuation of application No. 13/266,112, filed as application No. PCT/KR2010/002610 on Apr. 26, 2010, now Pat. No. 9,231,743.

(60) Provisional application No. 61/172,298, filed on Apr. 24, 2009.

(51) Int. Cl.
| | |
|---|---|
| *H04L 1/00* | (2006.01) |
| *H04L 5/00* | (2006.01) |
| *H04W 72/0453* | (2023.01) |
| *H04W 72/1268* | (2023.01) |
| *H04W 72/21* | (2023.01) |
| *H04W 72/23* | (2023.01) |
| *H04W 88/08* | (2009.01) |

(52) U.S. Cl.
CPC ............ *H04L 5/001* (2013.01); *H04L 5/0053* (2013.01); *H04L 5/0055* (2013.01); *H04L 5/0094* (2013.01); *H04W 72/1268* (2013.01); *H04W 72/21* (2023.01); *H04W 72/23* (2023.01); *H04L 5/0098* (2013.01); *H04W 88/08* (2013.01)

(58) Field of Classification Search
CPC ............ H04L 5/0055; H04W 72/0413; H04W 72/0453; H04W 72/14; H04W 72/1268; H04W 72/21; H04W 72/23; H04J 11/0069
USPC .......................................................... 370/329
See application file for complete search history.

(56) References Cited

U.S. PATENT DOCUMENTS

| | | | | |
|---|---|---|---|---|
| 9,496,995 | B2* | 11/2016 | Kim | H04W 72/23 |
| 9,668,260 | B2 | 5/2017 | Chung | H04W 72/0453 |
| 11,259,302 | B2* | 2/2022 | Chung | H04L 5/0053 |
| 2008/0212464 | A1 | 9/2008 | Kim et al. | |
| 2010/0110988 | A1 | 5/2010 | Marinier | H04B 1/707 370/328 |
| 2010/0208679 | A1* | 8/2010 | Papasakellariou | H04W 72/21 370/329 |
| 2011/0317652 | A1* | 12/2011 | Kim | H04W 24/10 370/329 |
| 2011/0317777 | A1* | 12/2011 | Huang | H04W 74/004 375/259 |
| 2013/0195039 | A1 | 8/2013 | Pan | H04L 5/001 370/329 |
| 2015/0092721 | A1 | 4/2015 | Papasakellariou | H04L 5/0053 370/329 |
| 2019/0281590 | A1 | 9/2019 | Pan | H04L 5/0094 |

OTHER PUBLICATIONS

Nokia, Nokia Siemens Networks: "Cross-CC scheduling and blind decoding", 3GPP TSG-RAN WG1 Meeting #50bis, R1-100319, Jan. 18-22, 2010.

U.S. Appl. No. 16/202,240, filed Nov. 28, 2018.

U.S. Appl. No. 15/594,125, filed May 12, 2017 (U.S. Pat. No. 10,172,134).

U.S. Appl. No. 14/956,759, filed Dec. 2, 2015 (U.S. Pat. No. 9,668,260).

U.S. Appl. No. 13/266,112, filed Oct. 24, 2011 (U.S. Pat. No. 9,231,743).

* cited by examiner ural Application No. 61/172,298 filed Apr. 24, 2009, all of which are incorporated herein by reference.

METHOD AND AND RECEIVING CONTROL SIGNAL FOR MERGING CARRIERS IN TRANSMISSION

This application is a continuation application of U.S. patent application Ser. No. 16/202,240 filed Nov. 28, 2018, which is a continuation application of U.S. patent application Ser. No. 15/594,125 filed May 12, 2017, now U.S. Pat. No. 10,172,134, which is a continuation of U.S. patent application Ser. No. 14/956,759 filed Dec. 2, 2015, now U.S. Pat. No. 9,668,260, which is a continuation of U.S. patent application Ser. No. 13/266,112 filed Oct. 24, 2011, now U.S. Pat. No. 9,231,743, which is a National Stage Entry of International Application No. PCT/KR2010/002610 filed Apr. 26, 2010, which claims priority to U.S. Provisional Application No. 61/172,298 filed Apr. 24, 2009, all of which are incorporated herein by reference.

TECHNICAL FIELD

The present invention relates to a method and apparatus for transmitting and receiving a control signal in a wireless access system, and more particularly, to a method and apparatus for efficiently transmitting and receiving a control signal in a communication system environment having carrier mergence applied thereto.

BACKGROUND ART

Generally, when a packet is transmitted in a mobile communication system, a receiver should inform a transmitter of a success or failure in packet reception. If the packet reception is successful, the receiver transmits ACK to enable the transmitter to transmit a new packet. If the packet reception is not successful, the receiver transmits NACK to enable the transmitter to retransmit the corresponding packet. This operation may be called ARQ (automatic request).

This ARQ operation may be combined with a channel coding scheme. In particular, the above-mentioned ARQ has been proposed as HARQ (hybrid ARQ) for raising system efficiency by lowering an error rate in a manner of combining a retransmitted packet with a previously received packet. In order to raise system throughput, the HARQ is requested to receive a ACK/NACK response from the receiver quicker than that of the ARQ operation. Hence, ACK/NACK in HARQ is transmitted by physical channel signaling.

Implementation of HARQ may be mainly into two types. A first type of HARQ implementation is CC (chase combining). In particular, when a retransmission is performed, a retransmitted packet is transmitted in a manner of having the same code bits using the same modulation scheme of a previously transmitted packet and the same coding rate of the previously transmitted packet. A second type of HARQ is IR (incremental redundancy). In particular, when a retransmission is performed, a transmission of code bits different from those of a previously transmitted packet is granted using a modulation scheme and coding rate different from those of the previously transmitted packet. In this case, a receiver may be able to raise system throughput by coding diversity.

In a multicarrier cellular mobile communication system, user equipments belonging to one or plural cells perform uplink (UL) data packet transmissions to a base station. Since a plurality of user equipments are able to transmit UL data packets in a single subframe, a base station needs to transmit ACK/NACK signals to a plurality of the user equipments in a single subframe as well. In particular, in 3GPP LTE system, a base station transmits ACK/NACK signals to a plurality of user equipments on a physical HARQ (hybrid ARQ) indicator channel (hereinafter abbreviated PHICH), i.e., a channel for carrying downlink (DL) ACK/NACK information for UL HARQ.

When a plurality of ACK/NACK signals transmitted by a base station to user equipments in a single subframe are multiplexed by CDMA in a partial time-frequency domain of a DL transmission band of a multicarrier system, they are discriminated from ACK/NACK signals for other user equipments by an orthogonal code or a pseudo orthogonal code multiplied in a time-frequency domain. Moreover, when QPSK transmission is performed, they may be divided into two different orthogonal phase components. In particular, in 3GPP LTE system, a plurality of ACK/NACK signals are transmitted on a plurality of PHICHs by being multiplexed by CDMA. In doing so, a unit of a multiplexed transmission by CDMA is called a PHICH group.

Meanwhile, in case that a specific user equipment attempts an initial access to a prescribed cell, it is necessary for the specific user equipment to acquire system information. Such a basic information in the system information as a system bandwidth and the like may be received on a physical broadcast channel (hereinafter abbreviated PBCH). Yet, in order to acquire detailed system information in the system information of a corresponding cell, it may be necessary for a user equipment to receive a physical downlink shared channel (hereinafter abbreviated PDSCH) for carrying general DL data.

In doing so, since scheduling information of PDSCH is carried on PDCCH of each subframe, a user equipment in the course of an initial access receives PBCH and then receives PDCCH of a specific subframe to recognize scheduling information on PDSCH for carrying detailed system information through the specific subframe. In particular, in order to receive the PDCCH having the scheduling information on the PDDSCH for carrying the detailed system information, the user equipment should be aware of a transmission position of the corresponding PDCCH.

Since PDCCH is generally mapped to a resource element (hereinafter abbreviated RE) except resource elements for carrying PHICH and other control signals, the user equipment should be aware how the PHICH and other control signals are mapped to a resource region, in order to receive the PDCCH.

DISCLOSURE OF THE INVENTION

Technical Problem

The object of the present invention is to provide a method and apparatus for transmitting a control signal.

Another object of the present invention is to provide a method and apparatus for transmitting a control signal in an asymmetric multicarrier environment.

A further object of the present invention is to provide a method and apparatus for allocating DL CC and/or UL CC to a user equipment in an asymmetric multicarrier environment.

Technical tasks obtainable from the present invention are non-limited the above mentioned effect. And, other unmentioned technical tasks s can be clearly understood from the following description by those having ordinary skill in the technical field to which the present invention pertains.

Technical Solution

Accordingly, embodiments of the present invention are directed to methods and apparatuses for transmitting and receiving a control signal in a wireless access system, and more particularly, to methods and apparatuses for transmitting and receiving a control signal (e.g., PDCCH signal) in an asymmetric multicarrier environment.

According to one embodiment of the present invention, a method of transmitting a control signal for asymmetric multicarrier in a wireless access system may include the steps of configuring a physical downlink control channel (PDCCH) signal including a carrier indicator field (CIF) indicating a downlink component carrier (DL CC) carrying downlink data, transmitting the PDCCH signal to a user equipment through a first DL CC, and transmitting the downlink data on a second DL CC indicated by the CIF to the user equipment through a physical downlink shared channel (PDSCH). In this case, the CIF may be determined based on a maximum value of the number of downlink component carriers (DL CCs) and the number of uplink component carriers (UL CCs) managed by the wireless access system (e.g., LTE-A system). And, the CIF may be included at a fixed position previously set irrespective of a type of a payload DCI format of the PDCCH.

According to another embodiment of the present invention, a method of receiving a control signal for asymmetric multicarrier in a wireless access system may include the steps of receiving a carrier indicator field (CIF) indicating a second downlink component carrier (DL CC) carrying downlink data on a first DL CC through a physical downlink control channel (PDCCH) and receiving the downlink data on the second DL CC indicated by the CIF through a physical downlink shared channel (PDSCH). In this case, a size of the CIF is determined based on a maximum value of the number of downlink component carriers (DL CCs) and the number of uplink component carriers (UL CCs) managed by the wireless access system (e.g., LTE-A system). And, the CIF may be included at a fixed position previously set irrespective of a type of a payload DCI format of the PDCCH.

Moreover, a user equipment may detect PDCCH transmitted to the user equipment by performing blind decoding on PDCCH candidates in a UE-specific search space and a common search space in the first DL CC and may obtain the CIF included in the corresponding PDCCH. The CIF may be included at a fixed position of the PDCCH payload with a fixed value.

According to another embodiment of the present invention, a base station, which transmits a control signal for asymmetric multicarrier in a wireless access system, may include a transmitting module configured to transmit a radio signal, a receiving module configured to receive a radio signal, and a processor configured to control a transmission of the control signal by controlling the transmitting module and the receiving module. In this case, the process may control the steps of configuring a physical downlink control channel (PDCCH) signal including a carrier indicator field (CIF) indicating a downlink component carrier (DL CC) carrying downlink data, transmitting the PDCCH signal to a user equipment through a first DL CC, and transmitting the downlink data on a second DL CC indicated by the CIF to the user equipment through a physical downlink shared channel (PDSCH). In this case, the CIF may be determined based on a maximum value of the number of downlink component carriers (DL CCs) and the number of uplink component carriers (UL CCs) managed by the wireless access system (e.g., LTE-A system). And, the CIF may be included at a fixed position previously set irrespective of a type of a payload DCI format of the PDCCH.

According to a further embodiment of the present invention, a user equipment, which receives a control signal for asymmetric multicarrier in a wireless access system, may include a transmitting module configured to transmit a radio signal, a receiving module configured to receive a radio signal, and a processor configured to control a transmission of the control signal by controlling the transmitting module and the receiving module. In this case, the processor may control the steps of receiving a carrier indicator field (CIF) indicating a second downlink component carrier (DL CC) carrying downlink data on a first DL CC through a physical downlink control channel (PDCCH) and receiving the downlink data on the second DL CC indicated by the CIF through a physical downlink shared channel (PDSCH). In this case, a size of the CIF is determined based on a maximum value of the number of downlink component carriers (DL CCs) and the number of uplink component carriers (UL CCs) managed by the wireless access system (e.g., LTE-A system). And, the CIF may be included at a fixed position previously set irrespective of a type of a payload DCI format of the PDCCH.

According to embodiments of the present invention, the CIF may be transmitted in a manner of being fixed to front part, a rear part or a prescribed position of the payload of the PDCCH. Moreover, if the maximum value of the number of the downlink component carriers (DL CCs) and the number of the uplink component carriers (UL CCs) is 5, it may be preferable that the size of the CIF is 3 bits.

The above-described embodiments of the present invention are just parts of preferred embodiments of the present invention. And, various embodiments reflecting the technical features of this invention can be derived and understood by those skilled in the art based on the detailed description of the present invention.

Advantageous Effects

Accordingly, the present invention may provide the following effects and/or advantages.

First of all, a control signal can be transmitted and received accurately and efficiently.

Secondly, a base station may be able to clearly allocate DL CC and/or UL CC for transmitting and receiving data in an asymmetric multicarrier environment to a user equipment.

Thirdly, as a control signal is transmitted and received in an asymmetric multicarrier environment, a user equipment is able to accurately transmit and receive DL data or UL data on DL CC and UL CC indicated by the control signal.

Effects obtainable from the present invention are non-limited the above mentioned effect. And, other unmentioned effects can be clearly derived and understood from the following description by those having ordinary skill in the technical field to which the present invention pertains. Namely, unintended effects attributed to implementation of this invention can be clearly derived from embodiments of the present invention by those having ordinary skill in the technical field to which the present invention pertains.

MODE FOR INVENTION

Figure 1B:
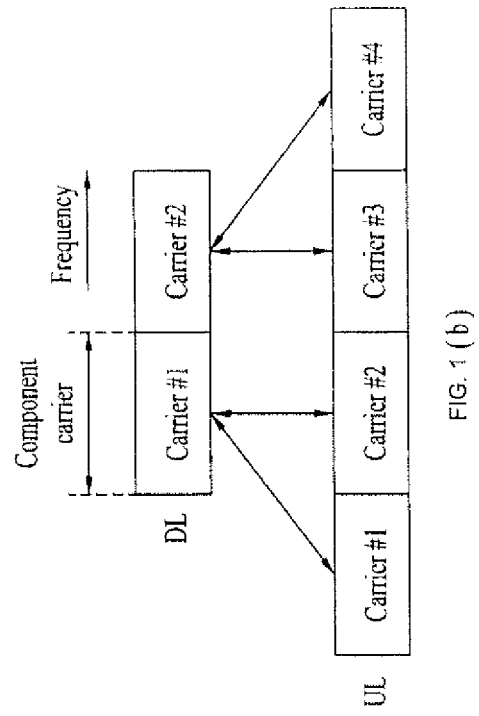
FIGS. 1 (*a*) and (*b*) are diagrams of an asymmetric structure of multi-band radio frequency (RF).

Embodiments of the present invention are directed to methods and apparatuses for transmitting and receiving a control signal in a wireless access system, and more particularly, to methods and apparatuses for transmitting and receiving a control signal (e.g., PDCCH signal) in an asymmetric multicarrier environment.

The following embodiments correspond to combinations of elements and features of the present invention in prescribed forms. And, it may be able to consider that the respective elements or features are selective unless they are explicitly mentioned. Each of the elements or features can be implemented in a form failing to be combined with other elements or features. Moreover, it may be able to implement an embodiment of the present invention by combining elements and/or features together in part. A sequence of operations explained for each embodiment of the present invention may be modifiable. Some configurations or features of one embodiment can be included in another embodiment or can be substituted for corresponding configurations or features of another embodiment.

In the description of the drawings, procedures or steps, which may ruin the substance of the present invention, are not explained. And, procedures or steps, which can be understood by those skilled in the art, are not explained as well.

In this disclosure, embodiments of the present invention may be described centering on the data transmission/reception relations between a base station and a mobile station. In this case, the base station may be meaningful as a terminal node of a network which directly performs communication with the mobile station. In this disclosure, a specific operation explained as performed by a base station can be performed by an upper node of the base station in some cases.

In particular, in a network constructed with a plurality of network nodes including a base station, it is apparent that various operations performed for communication with a mobile station may be performed by a base station or other networks except the base station. In this case, 'base station' can be replaced by such a terminology as a fixed station, a Node B, an eNode B (eNB), an advanced base station (ABS), an access point and the like.

And, 'mobile station (MS)' can be replaced by such a terminology as a user equipment (UE), a subscriber station (SS), a mobile subscriber station (MSS), an advanced mobile station (AMS), a mobile terminal and the like.

Moreover, a transmitting end may mean a fixed and/or mobile node that transmits a data service or an audio service. And, a receiving end may mean a fixed and/or mobile node that receives a data service or an audio service. Hence, a mobile station can become a transmitting end and a base station can become a receiving end, in uplink. Likewise, a mobile station becomes a receiving end and a base station can become a transmitting end, in downlink.

Embodiments of the present invention may be supportable by standard documents disclosed in at least one of wireless access systems including IEEE 802.xx system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document may be supportable by the above-mentioned standard documents.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention.

In the following description, specific terminologies used for embodiments of the present invention may be provided to help the understanding of the present invention. And, the use of the specific terminology may be modified into another form(s) within the scope of the technical idea of the present invention.

FIGS. 1 (a) and (b) is a diagram of an asymmetric structure of multi-band radio frequency (RF).

In order to efficiently use a multicarrier (or multiband), one MAC (medium access control) entity has been proposed to manage several carriers (e.g., several FA (frequency allocation) bands).

A Mac layer included in each of a transmitting end and a receiving end may be able to manage several carriers to efficiently use a multicarrier. In this case, in order to effectively transmit and receive the multicarrier, assume that each of the transmitting end and the receiving end may be able to transmit and receive multicarriers.

Since frequency carriers (FCs) managed by one MAC layer need not be contiguous to each other, it may be flexible in aspect of resource management. In particular, one MAC entity may be able to manage both contiguous aggregation of carriers situated contiguous with each other, and non-contiguous aggregation of carriers situated non-contiguous with each other.

Figure 1A:
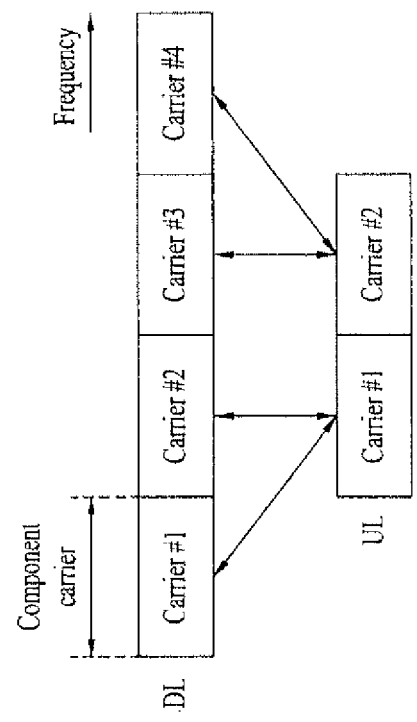

Referring to FIG. 1, FIG. 1(a) shows an asymmetric multicarrier structure in which the number of downlink component carriers (DL CCs) allocated to a mobile station is greater than that of uplink component carriers (UL CCs). And, FIG. 1(b) shows an asymmetric multicarrier structure in case that the number of DL CCs allocated to a mobile station is smaller than that of UL CCs.

In the following description, a frame structure for transmitting and receiving radio signals used in embodiments of the present invention is explained.

Figure 2:
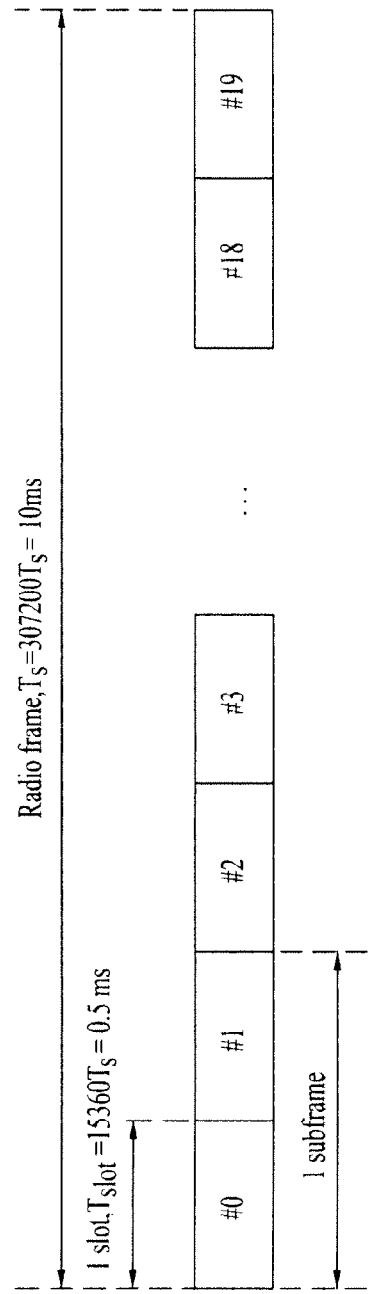
FIG. 2 is a diagram of a structure of a radio frame of type 1.
Figure 3:
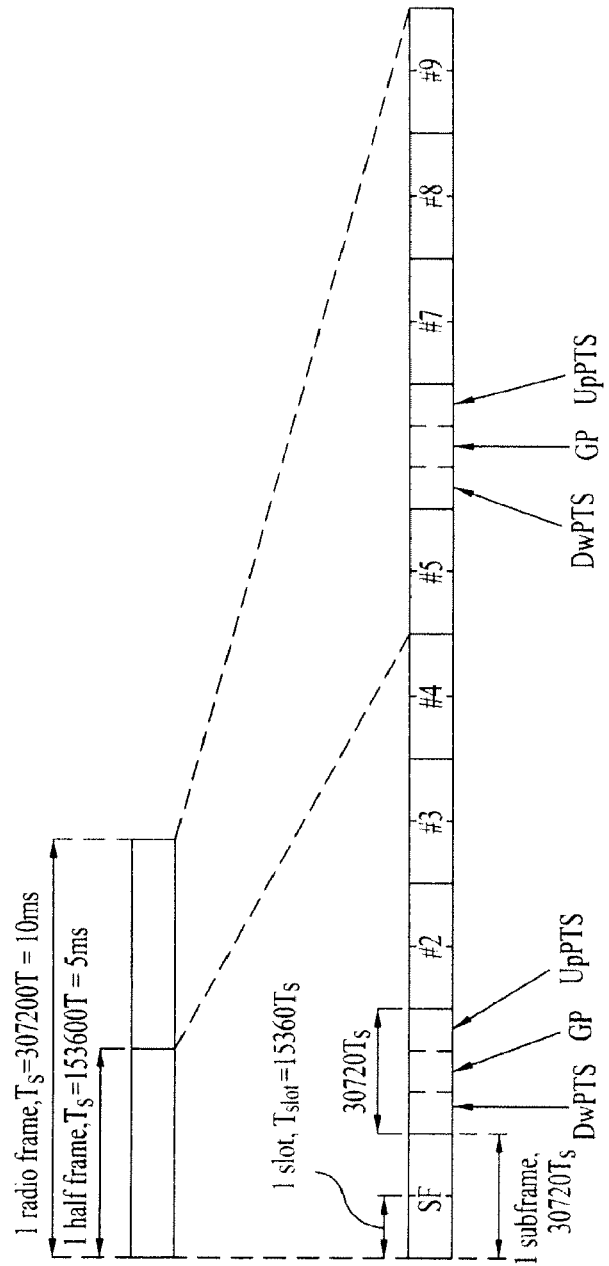
FIG. 3 is a diagram of a structure of a radio frame of type 2.

FIG. 2 is a diagram of a structure of a radio frame of type 1. And, FIG. 3 is a diagram of a structure of a radio frame of type 2.

In a cellular OFDM radio packet communication system, UL/DL data packet transmission may be performed by subframe unit. In this case, one subframe may be defined as a predetermined time interval including a plurality of OFDM symbols.

The 3GPP ($_3$rd generation partnership project) supports a radio (or wireless) frame structure of type 1 applicable to FDD (frequency division duplex) and a radio frame structure of type 2 applicable to TDD time division duplex).

A type-1 radio frame configured with 10 subframes. And, 1 subframe includes 2 slots. A type-2 radio frame configured with 2 half frames. And, each half frame includes subframes, DwPTS (downlink piloting time slot), GP (gap period) and UpPTS (uplink piloting time slot). In this case, 1 subframe includes 2 slots. In particular, 1 subframe may include 2 slots irrespective of a type of a radio frame.

Figure 4:
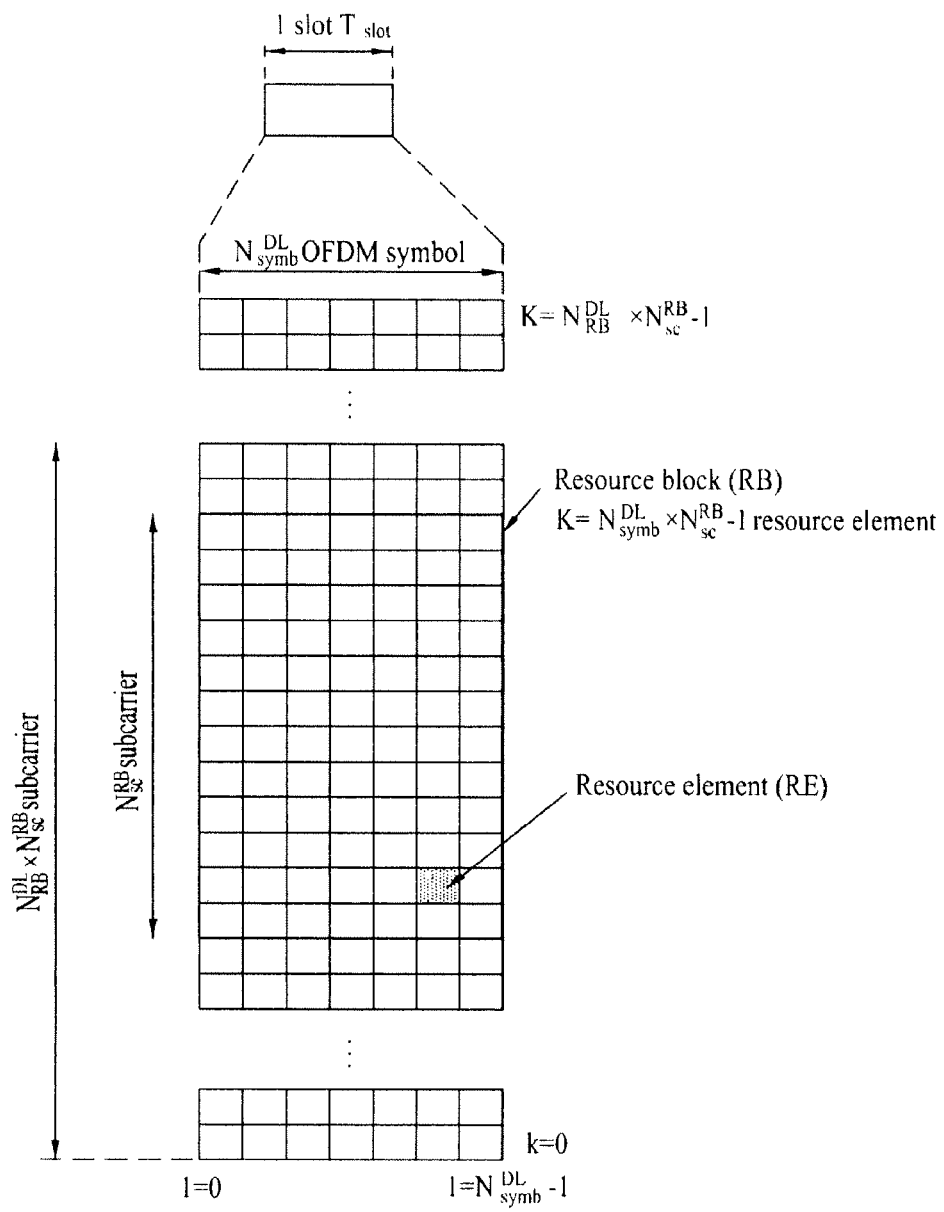
FIG. 4 is a diagram of a grid structure of a slot used in embodiments of the present invention.

FIG. 4 is a diagram of a grid structure of a slot used in embodiments of the present invention.

Referring to FIG. 4, a resource grid in one slot may include $N^{DL}_{RB} \times N^{RB}_{SC}$ subcarriers and $N^{DL}_{symb}$ OFDM symbols. In this case, the $N^{DL}_{RB}$ indicates the number of resource blocks (RBs) in DL, the $N^{RB}_{SC}$ indicates the number of subcarriers configuring a single RB, and the $N^{DL}_{symb}$ indicates the number of OFDM symbols in a DL slot.

In FIG. 4, a smallest unit of radio resource is a resource element (RE). One RE may be defined as 1 subcarrier and 1 OFDM symbol. And, one resource block (RB) may include $N^{RB}_{SC}$ subcarriers and $N^{DL}_{symb}$ OFDM symbols.

The RB may be used to describe a mapping relation between a prescribed physical channel and a prescribed resource element. The RB can be divided into a physical resource block (PRB) and a virtual resource block (VRB). The mapping relation between the VRB and the PRB may be described by 1 subframe unit or each slot unit configuring 1 subframe. And, the mapping relation between the VRB and the PRB may be described using the mapping relation between an index of the VRB and an index of the PRB.

Figure 5:
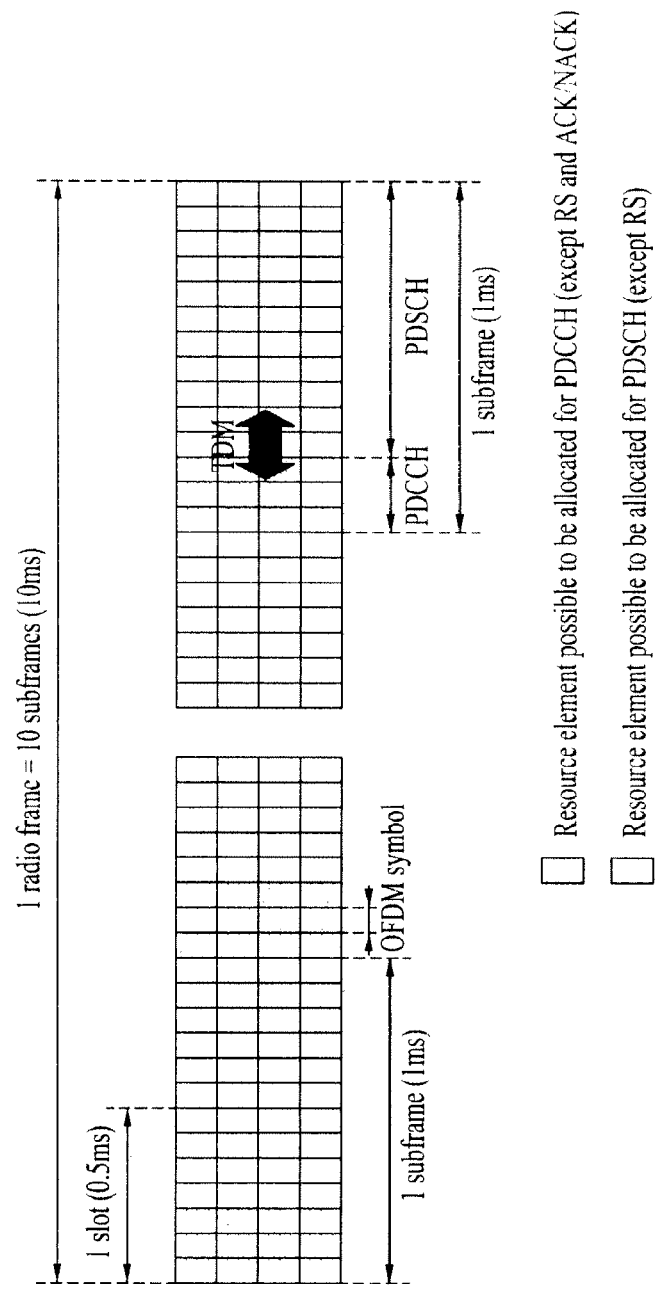
FIG. 5 is a diagram of a control channel region and a data channel region in a single frame.

FIG. 5 is a diagram of a control channel region and a data channel region in a single frame.

Referring to FIG. 5, resource regions in LTE system may be divided into a control region (n OFDM symbols, where n≤3) and a data region. In this case, a control channel may be assigned to the control region and a data channel may be assigned to a data region.

The control region in DL may start with a $1^{st}$ OFDM symbol of a subframe and may include at least one OFDMA symbol. A size of the control region may be independently set per subframe. The control region may be used to transmit L1/L2 (layer 1/layer 2) control signal. And, the data region may be used to transmit DL traffic.

Control channels assigned to the control region may include PCFICH (Physical Control Format Indicator CHannel), PHICH (Physical Hybrid-ARQ Indicator CHannel), PDCCH (Physical Downlink Control CHannel) and the like.

PDCCH may be assigned to first n OFDM symbols of a subframe. In this case, 'n' is an integer equal to or greater than 1 and may be indicated by PCFICH. The PDCCH may include at least one control channel elements (CCEs). Each CCE includes 9 REGs. Each REG may include 4 neighbor resource elements (REs) in a state that a reference signal is excluded. And, the RE is a minimum resource unit defined as 1 subcarrier×1 symbol (cf. FIG. 4).

A base station may inform each user equipment or a user equipment group of information related to resource allocation of such a transport channel as a paging channel (PCH) and a downlink-shared channel (DL-SCH), a DL scheduling grant, a UL scheduling grant, information related to HARQ and the like via PDCCH.

The PCH and the DL-SCH are carried on PDSCH. Information indicating that data of PDSCH will be transmitted to which user equipment (one or plural user equipments), information (i.e., DL grant) indicating how user equipments receive and decode PDSCH data and the like may be transmitted by being contained in the PDSCH.

For instance, assume that a specific PDCCH is CRC (Cyclic Redundancy Check)-masked with RNTI (radio network temporary identity) named 'A' and that information on data transmitted using a radio resource (e.g., frequency position) named 'B' and transmission format information (e.g., transport block size, modulation scheme, coding information, etc.) named 'C' is transmitted via specific subframe. In this case, a user equipment of a corresponding cell may monitor the PDCCH using RNTI information possessed by itself, a user equipment having the RNTI 'A' may receive the PDCCH, and the user equipment may be able to receive PDSCH indicated by 'B' and 'C' through the information of the received PDCCH.

Figure 6:
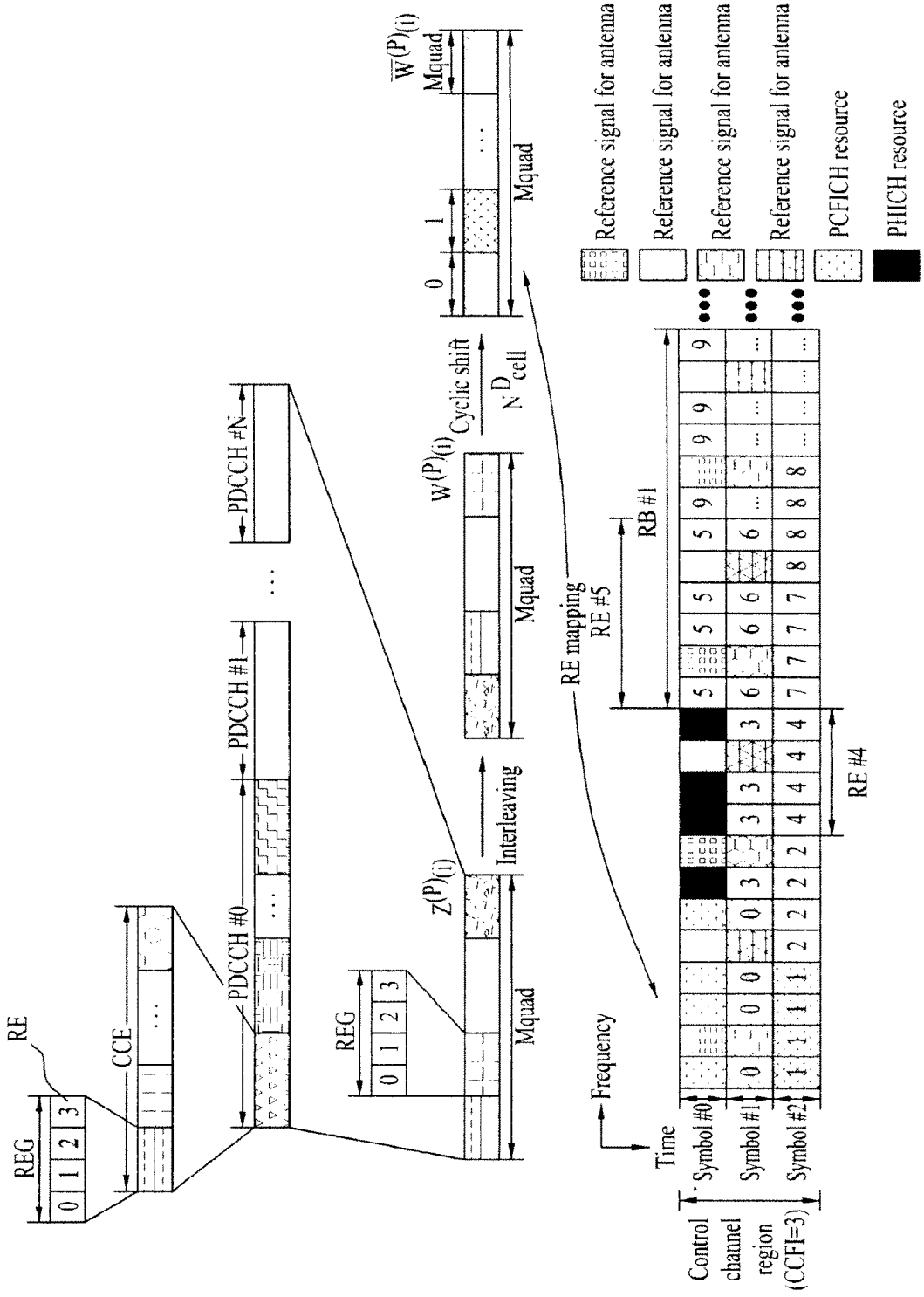
FIG. 6 is a diagram of a process for mapping PDCCH to a control channel.

FIG. 6 is a diagram of a process for mapping PDCCH to a control channel.

In the following description, PDCCH may be explained in detail. First of all, a base station may be able to transmit resource allocation and transmission format (e.g., DL grant) information of PDSCH, resource allocation information (i.e., UL grant) of physical UL shared channel (PUSCH), activation information on aggregation of transmit power control commands for individual user equipments in a random user equipment group and VoIP (voice over internet protocol) and the like to a user equipment on PDCCH.

A plurality of PDCCHs may be transmittable within a control region and a user equipment may be then able to monitor a plurality of the PDCCHs. PDCCH may include aggregation of at least one or more contiguous control channel elements (CCEs). After subblock interleaving has been performed on the PDCCH including the aggregation of the at least one or more contiguous CCEs, the corresponding PDCCH may be transmitted via a control region.

CCE is a logical allocation unit used to provide a coding rate to PDCCH according to states of radio channel. The CCE may correspond to a plurality of resource element groups. In accordance with correlation between the number of CCEs and a coding rate provided by the CCEs, a format of the PDCCH and the number of bits allocated to the PDCCH may be determined. Moreover, control information carried on PDCCH may be called downlink control information (DCI).

Table 1 shows DCI format.

TABLE 1

| DCI format | Contents |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |

TABLE 1-continued

| DCI format | Contents |
|---|---|
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |
| DCI format xx | TBD |

Referring to Table 1, DCI format 0 indicates UL resource allocation information, each of DCI format 1 and DCI format 2 indicates downlink resource allocation information, and each of DCI format 3 and DCI format 3A indicates UL TPC (transmit power control) command for random UE groups. Moreover, DCI format xx is the DCI format newly defined by the present invention and may be used to transmit a carrier indicator field explained in the following description later.

Referring to FIG. 6, a base station (e Node-B) may be able to configure a modulated symbol by performing encoding (e.g., tail biting convolution coding), rate matching and modulation (e.g., QPSK) on information bits according to DCI format to transmit to a user equipment. In this case, according to embodiments of the present invention, the modulated symbol may be called a resource element (RE). And, one REG may be constructed with 4 REs. Moreover, one CCE may be constructed with 9 REGs.

In order to configure one PDCCH, it may be able to use CCEs amounting to the number of {1, 2, 4, 8}. In this case, the {1, 2, 4, 8} may be called a CCE aggregation level. The PDCCH including the CCEs may be interleaved by REG unit and a cyclic shift based on a cell ID may be then performed thereon. The PDCCH may be then mapped to a physical resource.

In LTE system, a user equipment may not be aware that PDCCH signals transmitted by a base station are transmitted using a prescribed CCE aggregation level or a prescribed DCI format at a prescribed position. Hence, the user equipment may perform blind decoding to receive the PDCCH signal from the base station.

The blind coding is a scheme of checking whether a received PDCCH is a control channel of the user equipment in a manner of de-masking its ID (e.g., UE ID) from a CRC (Cyclic Redundancy Check) part of the received PDCCH and then checking a corresponding CRC. In LTE, a concept of a search space, as shown in FIG. 7, is defined in LTE to perform the blind decoding.

Figure 7:
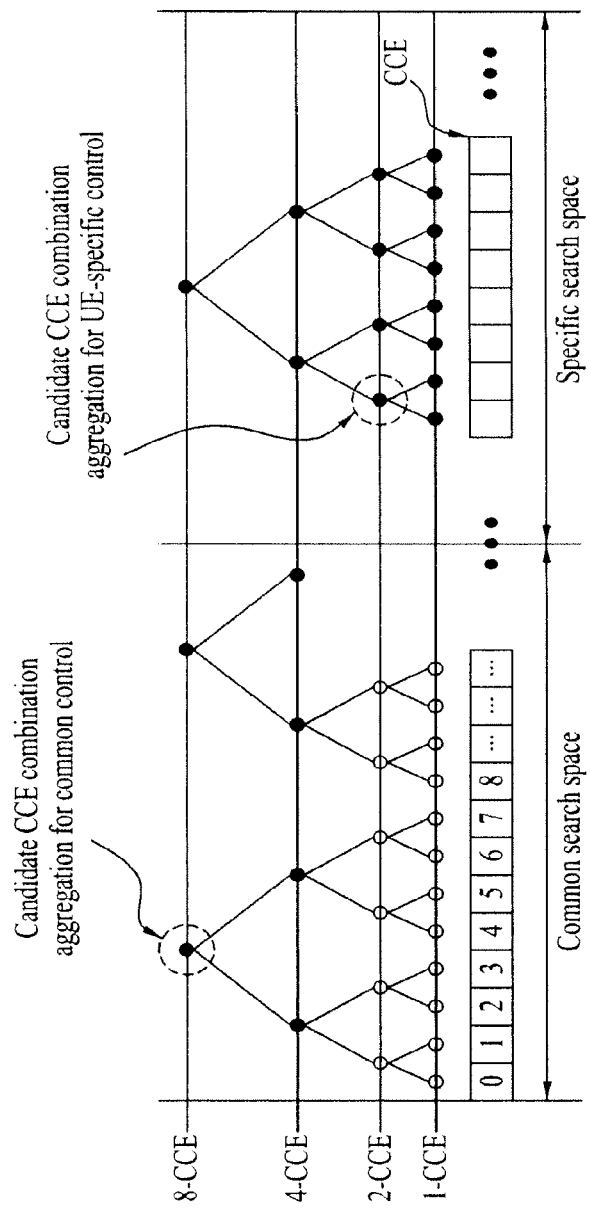
FIG. 7 is a diagram for one example of a search space for performing blind decoding.

FIG. 7 is a diagram for one example of a search space for performing blind decoding.

Referring to FIG. 7, a search space may be classified into a common search space (CSS) and a user equipment-specific search space (USS). In particular, the CSS may be constructed with 16 CCEs corresponding to CCE indexes 0 to 15, respectively. And, the CSS may be able to support PDCCH having a CCE aggregation level of {4, 8}. Meanwhile, the UCC may be constructed with 16 CCEs corresponding to CCE index regions 0 to Ncce-1, respectively.

And, the USS may be able to support PDCCH having a CCE aggregation level of {1, 2, 4, 8}. If the CCE indexes of the USS range 0 to Ncce-1, whereas the CCE indexes of the CSS range 0 to 15, it may mean that the CSS and the USS may overlap with each other.

A user equipment may perform blind decoding to find its PDCCH based on the CCE aggregation level within the USS and its UE (user equipment) ID. In particular, the user equipment may calculate a starting point of the USS, on which the blind decoding will be initially performed, using the UE ID and the CCE aggregation level. In this case, if the starting point belongs to a range of the CCE indexes 0 to 15, it may configure the USS overlapping with the CSS.

Table 2 shows one example of a search space configuration.

TABLE 2

| Type | Search space $S_k^{(L)}$ | | Number of | |
|---|---|---|---|---|
| | Aggregation level L | Size [in CCEs] | PDCCH candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 2C, 3/3A |
| | 8 | 16 | 2 | |

Referring to Table 2, USS may have 6 PDCCH candidates for each of CCE aggregation level 1 and CCE aggregation level 2 and may also have 2 PDCCH candidates for each of CCE aggregation level 4 and CCE aggregation level 8. In this case, DCI format may be selected from 0, 1, 1A, 1B and 2. CSS may have 4 PDCCH candidates at the CCE aggregation level 4 or may have 2 PDCCH candidates at the CCE aggregation level 8. In this case, DCI format may be selected from 0, 1A, 1C, 3 and 3A.

In the following description, a method of configuring USS based on Hashing Function may be explained. In particular, the USS may be configured by UE ID, CCE aggregation level and the number of CCEs in a corresponding subframe. And, the USS may be calculated by Formula 1 as follows.

$$S_k^{(L)} = L \cdot \{(Y_k + m) \bmod \lfloor N_{CCE,k}/L \rfloor\} + i \qquad \text{[Formula 1]}$$

$$Y_k = (A \cdot Y_{k-1}) \bmod D$$

In Formula 1, 'L' indicates CCE aggregation level, '$Y_k$' is a variable, $_{NCCE,k}$ indicates the number of CCEs, 'i' has a range of 0, . . . , L−1, 'm' has a range of 0, . . . , $M^{(L)}$−1, and '$M^{(L)}$' indicates the number of PDCCH candidates to be monitored in a given search space. Moreover, it is '$Y_{-1} = n_{RNTI}$≠0', it is 'A=39827', it is 'D=65537', and it is k 32 $\lfloor n_s/2 \rfloor$ Moreover, '$n_s$' indicates a slot number in a radio frame.

A user equipment may be able to perform blind decoding on PDCCH transmit candidate positions defined per individual CCE aggregation level in a received CCE column through CSS and USS.

In particular, the count of PDCCH blind decodings, which can be performed by an LTE UE in DL subframe to the maximum, may become 44. For instance, as described in Table 2, a UE may be able to perform 4 PDCCH blind decodings for CCE aggregation level 4, and 2 PDCCH blind decodings for CCE aggregation level 8 on the PDCCH format having two kinds of different DCI (download control information) payloads in CSS.

And, the UE may be able to perform 6 PDCCH blind decodings for CCE aggregation level 1, 6 PDCCH blind decodings for CCE aggregation level 2, 2 PDCCH blind decodings for CCE aggregation level 4 and 2 PDCCH blind decodings for CCE aggregation level 8 on 2 kinds of PDCCH formats having DCI payloads differing from each other in DL scheduling grant and UL scheduling grant through USS. Hence, the user equipment may be able to perform total 44 (=2*6+2*16) PDCCH blind decodings.

Carrier Indicator Field (CIF) and Payload Fixing Method

Unlike LTE Release 8 system or LTE Release 9 system, LTE-A system may configure a plurality of component carriers (CCs) situated contiguous or separate with frequency resource or may assign the component carriers to LTE-A user equipment.

LTE-A system may enable a plurality of carriers, which are set in a random transmission subframe, to simultaneously carry a physical control channel and a physical data shared channel through transmission scheme setting and resource allocation by a base station scheduler. This may be called carrier aggregation.

In the LTE-A system, the carrier aggregation may be individually applicable to DL carriers and UL carriers in FDD mode. In case of the carrier aggregation, a random LTE-A base station may differentiate the number of carriers set to transmit physical channel signals to a random LTE-A user equipment in DL and UL through scheduling. This may be named asymmetric carrier aggregation.

Moreover, the carrier aggregation may be available in TDD mode based on unpaired carriers. If the number of carriers in carrier aggregation in DL subframe is different from the number of carriers in carrier aggregation in UL subframe, it may be called asymmetric carrier aggregation as well.

Figure 8:
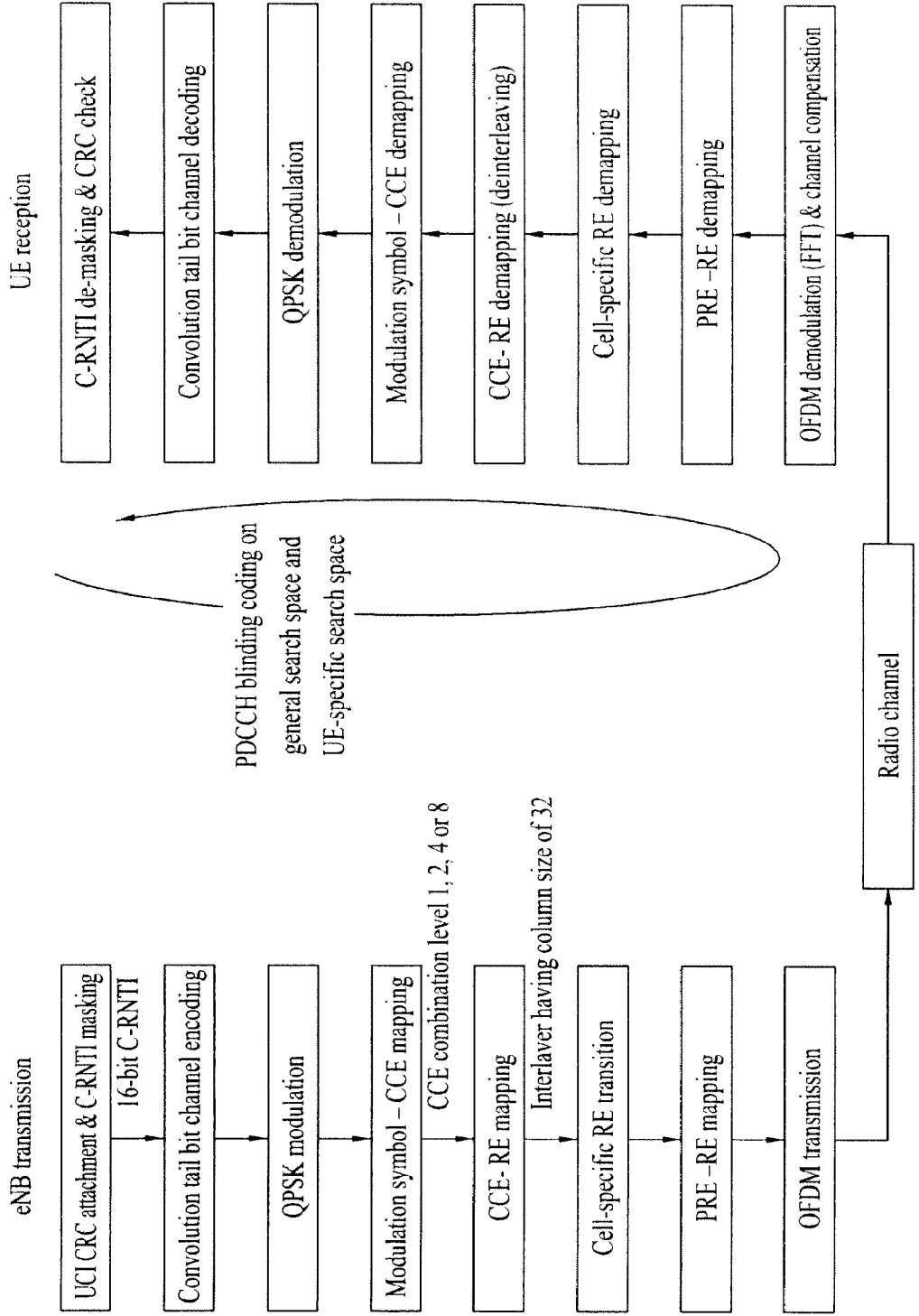
FIG. 8 is a diagram of a process for a base station to transmit PDCCH and a process for a user equipment to perform blind coding on PDCCH transmission candidate positions through CSS and USS according to one embodiment of the present invention.

FIG. 8 is a diagram of a process for a base station to transmit PDCCH and a process for a user equipment to perform blind coding on PDCCH transmission candidate positions through CSS and USS according to one embodiment of the present invention.

First of all, LTE-A system may define a physical layer processing and a MAC processing per individual carrier (e.g., component carrier) in case of carrier aggregation. Referring to FIG. 8, a data packet to be transmitted per individual carrier may be constructed with transport block in MAC layer of LTE base station (eNB). The transport block may be delivered to a physical layer via a transport layer. In the physical layer, an independent baseband processing and a separate IFFT (inverse fast Fourier transform) [in case of UL, per-carrier DFT (discrete Fourier transform) is defined prior to IFFT] processing may be performed.

A user equipment (UE) may detect PDCCH through the blind decoding described with reference to FIG. 7 and may be then able to reconstruct data included in the corresponding PDCCH through the operation shown in FIG. 8.

In the following description, when a DL CC carrying PDCCH containing a DL grant message is different from a DL CC carrying a PDSCH signal, a method of indicating the DL CC carrying the PDSCH signal may be explained. Moreover, when a UL CC linked to a DL CC carrying PDCCH containing a UL grant message is different from a UL CC carrying a PUSCH signal, a method of indicating the corresponding UL CC may be explained.

First of all, in carrier aggregation environment, a base station may be able to send a DL grant message for scheduling a radio resource allocated to a user equipment or a UL grant message to the user equipment via prescribed PDCCH. In this case, it may be able to define a carrier indicator field (CIF) to indicate that the corresponding DL or UL grant message is related to a PDSCH transmission on which DL CC or that the corresponding DL or UL grant message is related to a PUSCH transmission on which DL CC. In the following description, explained is how the CIF is transmitted in a payload structure of a control information message of the PDCCH.

Regarding the relation between the DL CC carrying the PDCCH and the DL CC carrying the PDSCH or the UL CC carrying the PUSCH, in case of the asymmetric carrier aggregation, CIF may be transmitted by being contained in the PDCCH control information message. In particular, in case of an asymmetric multicarrier environment, in which the number of DL CCs is greater than that of UL CCs, it may be advantageous for the transmission of PDCCH containing a random UL grant message to be performed by one of a plurality of DL CCs in aspect of DL resource overhead and UE blind decoding cost. Regarding a method of transmitting the PDCCH containing the UL grant message, one issued point may relate to how to set one DL CC to transmit the PDCCH containing the UL grant message among a plurality of the DL CCs and how a user equipment can identify a UL grant message for PUSCH transmission of which UL CC in blind-decoding the corresponding PDCCH.

Likewise, in case of an asymmetric multicarrier environment, in which the number of DL CCs is smaller than that of UL CCs, a base station may be able to transmit PDCCHs containing a plurality of UL grants, which indicate transmissions of PUSCHs on a plurality of UL CCs, to a user equipment in a random DL subframe via random DL CC.

However, in this case, the user equipment may be unable to check the UL CC carrying the corresponding PUSCH from a UL grant message received through PDCCH blind decoding with UL grant DCI format currently defined in LTE. Therefore, in order to clear this vagueness, a method for UL grant DCI format to indicate UL CC carrying a corresponding PUSCH may be required.

Regarding the relation between the DL CC carrying the PDCCH and the DL CC carrying the PDSCH or the UL CC carrying the PUSCH, for another example of leading to a situation for requiring CIF within a PDCCH control information message, it may be able to apply a configuration operation of a base station as follows. First of all, DL CC carrying PDCCH including a DL grant message may be intentionally set different from DL CC carrying a PDSCH signal based on a random purpose. Secondly, UL CC linked with DL CC carrying PDCCH including a UL grant message may be set different from UL CC carrying a PUSCH signal. This may be represented as cross-carrier scheduling.

Due to a series of DL asymmetric carrier aggregation setting for the cross-carrier scheduling or the cross-carrier scheduling application, a direct solution for the issues caused by the PDSCH transmission for the PDCCH transmission including the DL grant message or the PUSCH transmission for the PDCCH transmission including the UL grant message may include the steps of defining DCI formats of new DL and UL grant messages including an index of DL CC carrying PDSCH scheduled by a base station or an index of UL CC carrying PUSCH scheduled by a base station and then providing them to a user equipment via PDCCH including the same.

In addition, in order to mitigate the excessive increase of overhead of PDCCH blind decoding performed by a random LTE-A user equipment due to the carrier aggregation, in case that a base station transmits PDCCHs including a plurality of DL or UL grant messages in a random physical resource region on which a random user equipment performs PDCCH blind decoding, it may be able to consider the following transmissions. First of all, the transmission may be performed by fixing a size of payload of all DCI formats for DL grants or UL grants [Case of separate coding]. Secondly, a single UL grant may be transmitted irrespective of the number of UL CC [Case of joint coding].

According to the present invention, it may be able to newly define a carrier indicator field (CIF) to indicate DL CC carrying PDSCH scheduled through a corresponding grant message control information or UL CC carrying PUSCH on a DL or UL grant message or its DCI format in a situation that the aforesaid asymmetric carrier aggregation or the aforesaid cross-carrier scheduling is applied.

In particular, in case that DL CC carrying PDCCH including a DL grant message is different from DL CC carrying PDSCH scheduled through the corresponding PDCCH, the CIF may be able to indicate the DL CC carrying the PDSCH. In this case, the CIF may be transmitted in a manner of being included in the DL grant message or PDCCH payload carrying the same. Moreover, in case that UL CC linked with DL CC carrying PDCCH including a DL grant message is different from UL CC carrying PUSCH scheduled through the corresponding PDCCH, the CIF may be able to indicate the UL CC carrying the PUSCH. In this case, the CIF may be transmitted in a manner of being included in the UL grant message or PDCCH payload carrying the same.

The CIF may be able to indicate UL CC carrying PUSCH scheduled through PDCCH irrespective of a position (i.e., carrier index) of transmission DL CC of the corresponding PDCCH carrying a UL scheduling grant message. And, the CIF may be able to indicate DL CC carrying PDSCH scheduled through PDCCH irrespective of a position (i.e., carrier index) of DL CC of the corresponding PDCCH carrying a DL scheduling grant message.

In this case, the CIF may be included in a DCI format for the UL grant message or a DCI format for a DL grant message. The DCI format including the CIF may be newly defined as a new format or may use the DCI formats described with reference to Table 1 entirely or in part.

Figure 9:
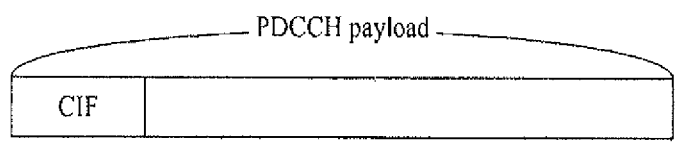
FIGS. 9(a), (b) and (c) are diagrams for methods of setting a carrier indicator field according to one embodiment of the present invention.
Figure 9B:
Figure 9:
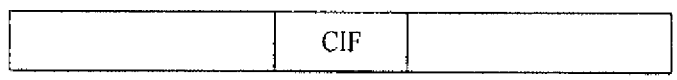

FIG. 9 is a diagram for methods of configuring a carrier indicator field according to one embodiment of the present invention.

Referring to FIG. 9, CIF may be transmitted at a fixed position of DCI format payload of PDCCH carrying a random DL or UL grant message. A transmission mode (e.g., closed-loop/open-loop MIMO precoding transmission, transmit diversity and/or single/multiple antenna transmission, etc.) applied to PDSCH transmission on a random DL CC in LTE-A or PUSCH transmission on a random UL CC is the information basically configured by a base station. In particular, assume that a corresponding transmission mode is previously indicated to a user equipment and that the user equipment is already aware of the corresponding transmission mode.

A user equipment performs blind decoding on a transmission of PDCCH including a DL or UL grant message per transmission mode, performs a CRC error check, and may be then read a DCI format payload. In this process, it may happen that each of control information messages respectively having DCI formats different from each other may have the same payload size due to such a reason as a difference in condition including a carrier band on DL CC or UL CC and the like.

To cope with this situation, a base station may transmit a CIF to a user equipment by defining the CIF at a fixed position in a PDCCH payload irrespective of a presence or non-presence of equivalence of a DCI format, a presence or non-presence of equivalence of a carrier band and/or a type of DCI format. Hence a user equipment, which is already aware of a transmission mode of individual DL CC and/or UL CC, reads the CIF at the fixed position right after completion of the CRC error check and may be then obtain the configuration of control information payload of the rest of the DCI format.

As mentioned in the foregoing description, regarding the methods of fixing the position of the CIF, a CIF field may be inserted at a front part (e.g., MSB) of PDCCH payload in a fixed size [cf. FIG. 9 (*a*)], may be inserted at a last part (e.g., LSB) of the PDCCH payload in a fixed size [cf. FIG. 9 (*b*)], or may be inserted at a prescribed position of the PDCCH payload in a fixed size [cf. FIG. 9 (*c*)].

In this case, the size of the CIF may be determined in a manner of being fixed on the basis of the number of DL CC and UL CC managed by a base station. On the other hand, the size of the CIF may be determined variably in accordance with the number of DL CC and/or the number of UL CC set for a corresponding user equipment for the purpose of transmission of PDSCH or PUSCH.

In the following description, a method of setting a size of CIF may be explained in detail.

First of all, a base station may be able to indicate a component carrier (CC) carrying a PDSCH or PUSCH signal using a CIF in case of applying carrier aggregation.

In case that a CIF is included in a DCI format payload of PDCCH including a UL or DL grant message, in aspect of optimizing to manage a size of the DCI format payload, a size of the CIF may be preferably defined as a bit size capable of appropriately representing the number of DL CC set for a user equipment to receive PDSCH from a base station and/or the number of UL CC set to transmit PUSCH.

For instance, if the number DL CCs set for a user equipment to receive PDSCH is 2, CIF may be included in a DCI format payload of a DL grant PDCCH in a size of 1 bit. If the number of DL CCs is 4, a 2-bit CIF may be included in a DCI format payload of a DL grant PDCCH. In particular, if the number of DL CC or UL CC set for a user equipment to receive PDSCH or transmit PUSCH is set to N, it may be able to set a size of a CIF to a minimum number of bits capable of representing the N.

Figure 10:
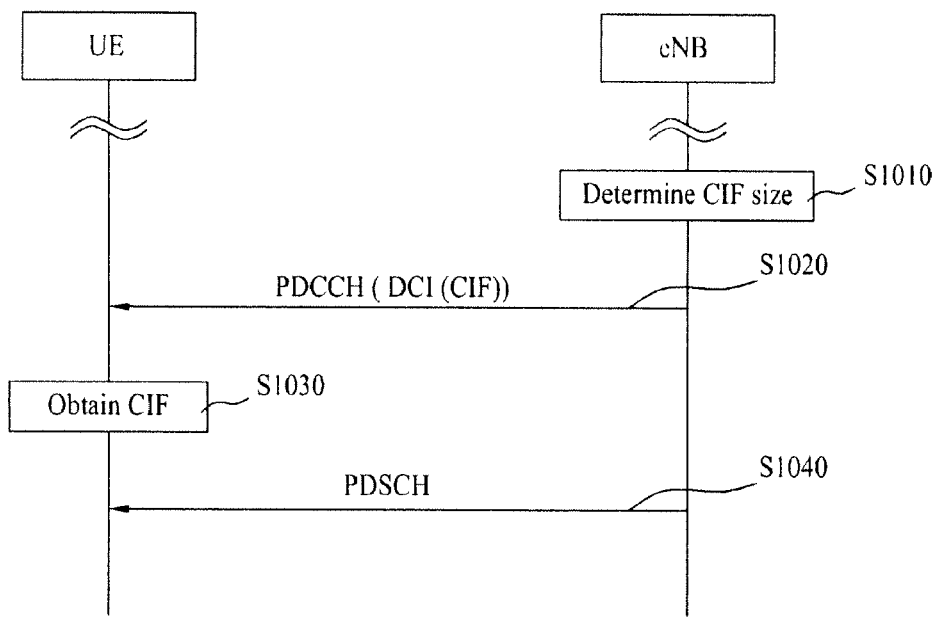
FIG. 10 is a diagram for one of methods of transmitting a carrier indicator field according to an embodiment of the present invention.

FIG. 10 is a diagram for one of methods of transmitting a carrier indicator field according to an embodiment of the present invention.

Referring to FIG. 10, a base station may be able to determine a size of CIF included in PDCCH. For instance, the base station may be able to determine a size of CIF by such a method described with reference to FIG. 9 based on the maximum number of DL CC set for the PDSCH transmission to a corresponding user equipment and/or the maximum number of UL CC set for the PUSCH reception [S1010].

In the step S1010, described is the case that the base station determines the size of the CIF. Yet, in another aspect of the present invention, a value of the CIF may be determined in accordance with the maximum number of component carriers available for the LTE system. In this case, the base station may be able to use a size of the CIF previously set by the LTE system irrespective of a DL/UL CC value managed by the base station itself.

The base station eNB may be able to configure PDCCH including the size-determined CIF. In particular, the base station has the CIF included in a preset fixed part of PDCCH payload and may be then able to transmit it to the user equipment UE. In doing so, a position of the CIF assigned to the PDCCH payload may refer to FIG. 9 [S1020].

The user equipment UE may be able to obtain the CIF carried on the PDCCH by performing blind decoding (cf. FIGS. 6 to 8) [S1030].

Finally, the user equipment may be able to receive the PDSCH via the DL CC indicated by the CIF [S1040].

The CIF transmitting method described with reference to FIG. 10 may be identically applicable to a method of fixing a size and transmission position of CIF in case of transmission of PDCCH including a UL grant message. Hence, a user equipment may be able to transmit PUSCH via the UL CC indicated by the CIF.

In case that a size of CIF is changed in accordance with the number of DL CC or UL CC set for a user equipment, a range of a size change of a target DCI format payload, on which PDCCH blind decoding may be performed by the user equipment in accordance with a case of a carrier band between individual CCs and a transmission mode configuration of the individual CC, may be increased. For instance, in case of a size change of a resource block setting field for a size of a carrier band of a specific DL or UL CC and a change of UE-specific grant DCI format on PDCCH in accordance with a transmission mode, a size of CIF may be changed in accordance with the number of DL or UL CC set for a corresponding UE by a base station. This situation may cause an effect that a range of a change of a whole PDCCH payload is increased. Due to this situation, it may be advantageous in that a function part of handling complicated situations for a PDCCH blind decoding function of a user equipment should be further included or in that complexity and overhead of the PDCCH blind decoding may be increased.

In consideration of the above disadvantages, the present invention may adopt a method of a applying a CIF in a manner of fixing a size of the CIF on a DL or UL grant message DCI format for an LTE-A base station to indicate DL/UL CC for PDSC/PUSCH transmission to an LTE-A user equipment on a system irrespective of the number of DL/UL CCs set for the user equipment by the base station.

In the following description, a method of determining a size of CIF included in PDCCH by an LTE system and/or a base station may be explained, In this case, it may be necessary for the CIF to have the size enough to indicate DL/UL CCs allocated to a user equipment supportive of LTE-A.

A size of CIF applied by a base station and a user equipment in LTE-A system may be derived using Formula 2 as follows.

$$size\_of\_CIF = \lceil \log_2 M \rceil \quad \text{[Formula 2]}$$

In Formula 2, the M may be set to a maximum value of a maximum number of DL/UL CC, which can be assigned or configured for a random user equipment by a base station to perform PDCCH/PUSCH transmission on carrier aggregation in LTE-A system. In particular, a value of the M may be determined as Max {maximum # of DL CCs settable for a user equipment by a base station in LTE-A system, maximum # of UL CCs settable for a user equipment by a base station in LTE-A system}. In case that carrier aggregation is applied in LTE-A system, when a base station supports maximum 5 of DL CCs assigned or configured for a user equipment, if a maximum number of UL CCs assigned or configured for PUSCH is smaller than that of the DL CCs, the value of M may be determined as 3 bits by Formula 2.

The CIF, of which size is determined by a random one of the above-proposed methods, may be defined as a new DCI format in a manner of being explicitly added to a DCI (downlink control information) format of DL or UL grant message. Hence, a new DCI format (DCI format xx) is defined as well as a previously defined DCI format (cf. Table 1) and a base station may be able to transmit a DL or UL grant message including CIF to a random LTE-A user equipment on PDCCH using the new DCI format. In particular, the CIF may be explicitly added to a DL and/or UL grant DCI format.

According to another proposal of the present invention to have CIF included in a random PDCCH DCI format, bits of at least one or more fields among control information fields (cf. Table 1), in which the CIF is designated to a DCI format, may be used entirely or in part as a field for the above-described CIF of the present invention.

For instance, some of CIF bits having randomly fixed sizes and randomly fixed positions may be transmitted in a manner of being defined as a new field on an explicitly applied DCI format and the rest of the bits may be used in a manner that some or all of the bits of the previously defined fields are switched. In this case, a previous field considerable to transmit CIF bit or state in a random DCI format may be designated as follows.

First of all, in case that CIF is used to indicate UL CC carrying a random PUSCH, padding bits of X bits (X 1) for a size matching with a series of DL DCI format in UL grant DCI format [1], 1 1-bit frequency hopping indicator [2], spare bits or states in resource assignment (RA) [3], and/or spare bits or states in MCS field [4] may be usable for the CIF.

Secondly, in case that CIF is used to indicate DL CC carrying a random PDSCH, padding bits of Y bits (Y≥1) for a size matching with a series of other DL DCI format or UL DCI format in DL grant DCI format [1], spare bits or states in resource assignment (RA) [2], and/or spare bits or states in MCS field [3] may be usable for the CIF.

When bits corresponding to CIF are newly defined, as mentioned in the foregoing description of the present invention, they may be inserted at a fixed position in a fixed size (cf. FIG. 9) on payload of PDCCH of a random DCI format. In case that the above-described previous fields are switched to be used as some or all of CIF bits, it may be able to consider a method of transmitting the corresponding fields at a previously defined position. Instead, the fields may be transmitted at a fixed position irrespective of DCI format.

In doing so, if a field newly defined for CIF information is applied in the same manner of a field defined in a previous DCI format, a position of the newly defined field may be fixed. Moreover, in case that fields of a previous DCI format are used as CIF, they can be designated to a prescribed fixed position in a previous DCI format.

According to another embodiment of the present invention, a method of transmitting CIF may be described as follows. First of all, LTE-A base station may be able to perform separate coding on a payload part defined separate from a previous DCI format of PDCCH for a CIF to transmit. In doing so, CIF assigned position in all DL or UL grant PDCCH payload may be determined as a position designated when CIF bits are multiplexed with coded bits or modulation symbols of another DL or UL grant message information in coded bits or their modulation symbols (e.g., QPSK). Moreover, a position on {DCCH payload of CIF coded bit or modulation symbol may be fixed irrespective of a type of control information of DL or UL grant multiplexed together or a type of DCI format.

For UL/DL grant PDCCHs transmitted by LTE-A base station, a user equipment (UE) may be able to obtain a CIF indicating DL/UL CC carrying PDSCH/PUSCH scheduled for the user equipment from PDCCH received through blind decoding [cf. FIGS. 6 to 8].

The terminology 'CIF' used in the embodiments of the present invention may be used as the same meaning of such a terminology as a component carrier index (CCI). Occasionally, an index of DL/UL CC indicated via CIF may be able to use an intact index of CCI uniquely defined in accordance with the number of DL/UL CC set for a random LTE-A user equipment or a setting situation.

In this case, the CCI may be configured by a base station for the purpose of indicating DL CC and/or UL CC allocated to a user equipment for a case of carrier aggregation and may be then usable by being configured through RRC signaling to the user equipment.

According to embodiments of the present invention, in a situation of an asymmetric multicarrier environment, in which DL CCs are allocated more than UL CCs, or a cross-carrier scheduling situation, if a UL grant message is carried on one DL CC among multiple DL CCs linked to UL CC, it may be more efficient in aspects of DL PDCCH resource overhead and blind decoding costs of a user equipment.

Likewise, if a DL grant message is carried on one DL CC for PDSCH transmission on a random DL CC, it may be more efficient in aspects of DL PDCCH resource overhead and blind decoding costs of a user equipment. Moreover, in an asymmetric multicarrier environment having UL CCs allocated more than DL CCs, a method of indicating a UL CC using CIF may be required for eliminating unclearness of DL CC identification on a UL grant message.

UL ACK/NACK Transmitting Method

In the following description, a method of transmitting UL ACK/NACK (A/N) is explained.

In an asymmetric multicarrier structure in which the number of DL CC is greater than that of UL CC, in case of generating transport block (TB) per component carrier, LTE-A user equipment may have to transmit multiple A/N information corresponding to PDSCH on UL CC. In this case, a user equipment may be able to consider a UL A/N design such as a method of transmitting multiple A/N feedback for each UL CC [1] or a method of transmitting one bundled A/N for each UL CC [2].

In doing so, the multiple A/N transmission may be configured using multiple A/N PUCCH, channel selection, high order modulation and joint coding scheme. Moreover, the bundled A/N transmission may be based on HARQ bundling for multiple DL CCs linked with UL CC.

At least, in case of a non-power limited UE situated at a central part of a cell, if A/N bundled die to DTX detection problem and overhead of retransmission via bundling is transmitted, it may be inappropriate in aspect of UL resource utilization. Hence, in case of a UE situated at a cell center, a multiple A/N transmitting method may be more appropriate than an A/N bundling scheme.

A UL A/N resource allocating method for a scheduled PDSCH transmission may be close relation to a UL A/N design problem and a problem of backward compatibility of LTE Rel-8 user equipment with a previous system.

In an asymmetric multicarrier structure, in which the number of UL CC is greater than that of DL CC, it may be able to use multiple UL CCs for UL A/N transmission. In this case, in aspect of UL resource utilization, it may be preferable that UL A/N corresponding to PDSCH is carried on one UL CC.

In particular, in an asymmetric multicarrier environment in which DL CC exist more than UL CC, in case of a non-power limited UE, multiple A/N feedback in each UL CC is more efficient than A/N bundling. In an asymmetric multicarrier environment in which DL CC exist less than UL CC, it may be necessary to further define the DL/UL linkage between PDSCH transmission and UL A/N feedback.

DL ACK/NACK Transmitting Method

A method of transmitting DL ACK/NACK (A/N) is explained.

In an asymmetric multicarrier environment in which DL CCs are allocated more than UL CC, DL A/N transmission for PUSCH may be preferably performed on one DL CC among multiple DL CCs linked to UL CC in a manner similar to that of UL grant transmission. A resource (i.e., PHICH group) for DL A/N in each DL CC may be determined in accordance with the number of DL RB and a scale parameter. Hence, multiple DL A/N may be transmitted on multiple DL CCs for PUSCH transmission.

A method of selecting DL CC used for DL A/N transmission may be described as follows. First of all, if DL CC is selected, it may be performed based on an existence of non-PHICH DL CC and selection of DL CC for UL grant PDCCH transmission. In particular, DL A/N corresponding to PUSCH may be transmitted on a reference carrier used for UL grant transmission. Hence, the reference carrier may be usable for DL A/N transmission.

In an asymmetric multicarrier environment in which more UL CCs are allocated than DL CCs, multiple DL A/N transmission or DL A/N bundling may be taken into consideration in case of transmitting a plurality of PUSCHs on UL CC linked to DL CC. In this case, in aspect of throughput loss, multiple A/N transmission is more efficient than A/N bundling. Yet, the A/N bundling may be considered to maintain the current LTE Rel-8 PHICH design.

Therefore, in an asymmetric multicarrier environment in which more DL CCs exist than UL CCs, DL A/N for PUSCH transmission may be preferably transmitted on one DL CC used for UL grant transmission. Moreover, in an asymmetric multicarrier environment in which more UL CCs exist than DL CCs, in case of transmission of multiple PUSCH on UL CC linked to DL CC, it may be able to consider multiple DL A/N or A/N bundling.

Figure 11:
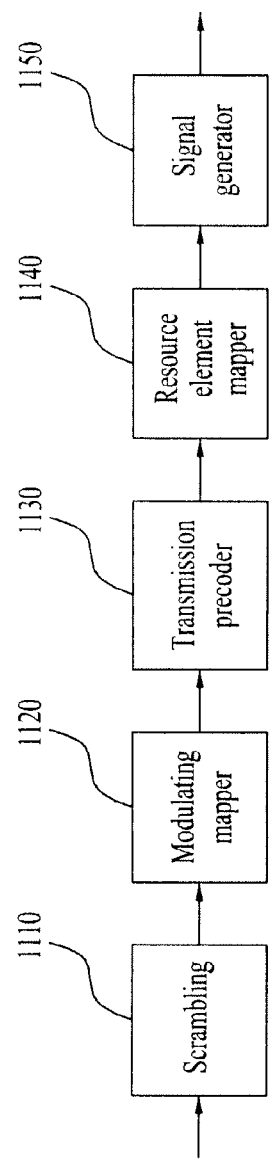
FIG. 11 is a diagram of a signal processing for a user equipment to transmit a UL signal according to an embodiment of the present invention.

FIG. 11 is a diagram of a signal processing for a user equipment to transmit a UL signal according to an embodiment of the present invention.

Referring to FIG. 11, a scrambling module 1110 of a user equipment may scramble a transmitted signal to transmit a UL signal using a UE-specific scrambling signal. The scrambled signal may be inputted to a modulation mapper 1120 and may be then modulated into a complex symbol by BPSK, QPSK or 16 QAM in accordance with a type of the transmitted signal and/or a channel status. Thereafter, the modulated complex symbol may be spread by a transform precoder 1130 corresponding to DFT spreading and may be then inputted to a resource element mapper 1140. The resource element mapper 1440 may be then able to map the complex symbol to a time-frequency resource element to be used for real transmission. The above-processed signal may enter an SC-FDAM signal generator 1150 and may be then transmitted to a base station via an antenna.

In particular, a user equipment may generate radio signals through the signal processing described with reference to FIG. 11 and may be then able to transmit the radio signals to a base station on UL channels. For instance, a user equipment performs signal processing on input data and then transmits the corresponding data on PUSCH. Alternatively, a user equipment may be able to transmit A/N signals to a base station by the signal processing described with reference to FIG. 11. The base station may be then able to obtain the corresponding UL signals by inversely performing the signal processing described with reference to FIG. 11.

Figure 12:
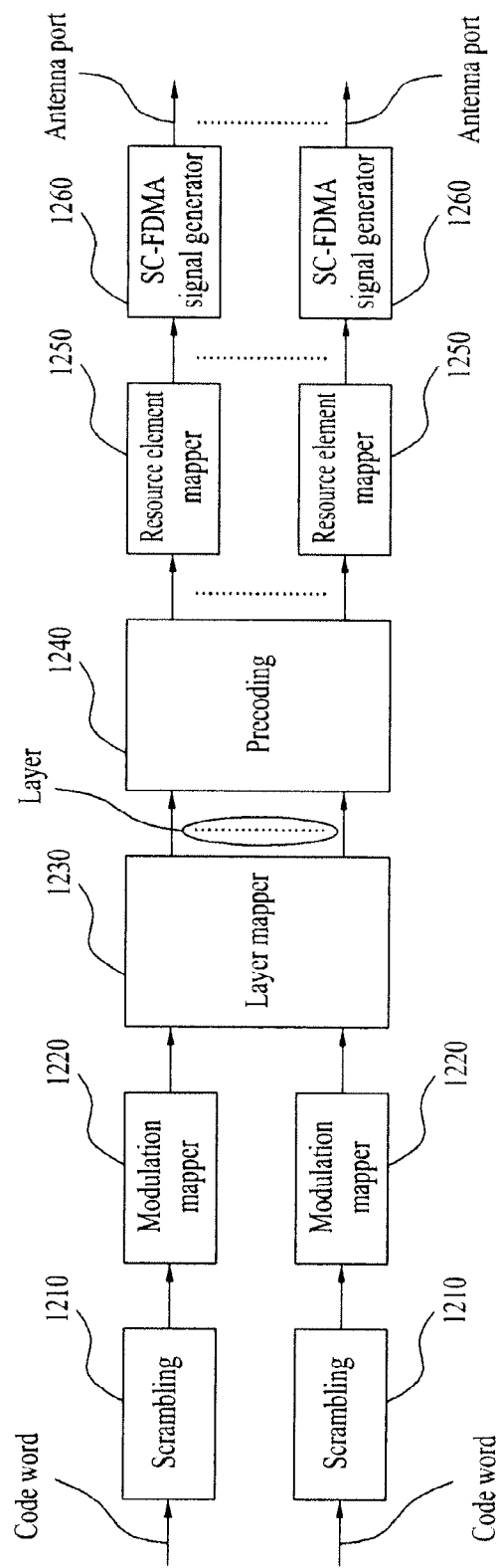
FIG. 12 is a diagram of a signal processing for a base station to transmit a DL signal according to an embodiment of the present invention.

FIG. 12 is a diagram of a signal processing for a base station to transmit a DL signal according to an embodiment of the present invention.

Referring to FIG. 12, a base station in 3GPP LTE system may be able to transmit at least one code word in DL. Hence, the at least one code word may be processed into a complex symbol via a scrambling module 1210 and a modulation mapper 1220 like the UL shown in FIG. 11. Thereafter, the complex symbol may be mapped to a plurality of layers by a layer mapper 1230 and each of the layers may be assigned to each transmitting antenna by being multiplied by a prescribed precoding matrix in accordance with a channel status by a precoding module 1240. The above-processed transmitted signal per antenna may be mapped to a time-frequency resource element to be used for a transmission by a corresponding resource element mapper 1250, may enter an OFDM signal generator 1260, and may be then transmitted via each antenna. A base station may generate radio signals through the signal processing described with reference to FIG. 12 and may be then able to transmit the radio signals to a user equipment on DL channels.

In particular, a base station may generate radio signals through the signal processing described with reference to FIG. 12 and may be then able to transmit the radio signals to a user equipment on DL channels. For instance, a base station performs signal processing on input data and then transmits the corresponding data on PDCCH or PDSCH or may transmit A/N signals to a user equipment by the signal processing described with reference to FIG. 12. In particular, the base station may be able to transmit the PDCCH signal described with reference to FIG. 8 using the components described with reference to FIG. 12. Moreover, a user equipment may be able to obtain the corresponding DL signals by inversely performing the signal processing described with reference to FIG. 12.

Figure 13:
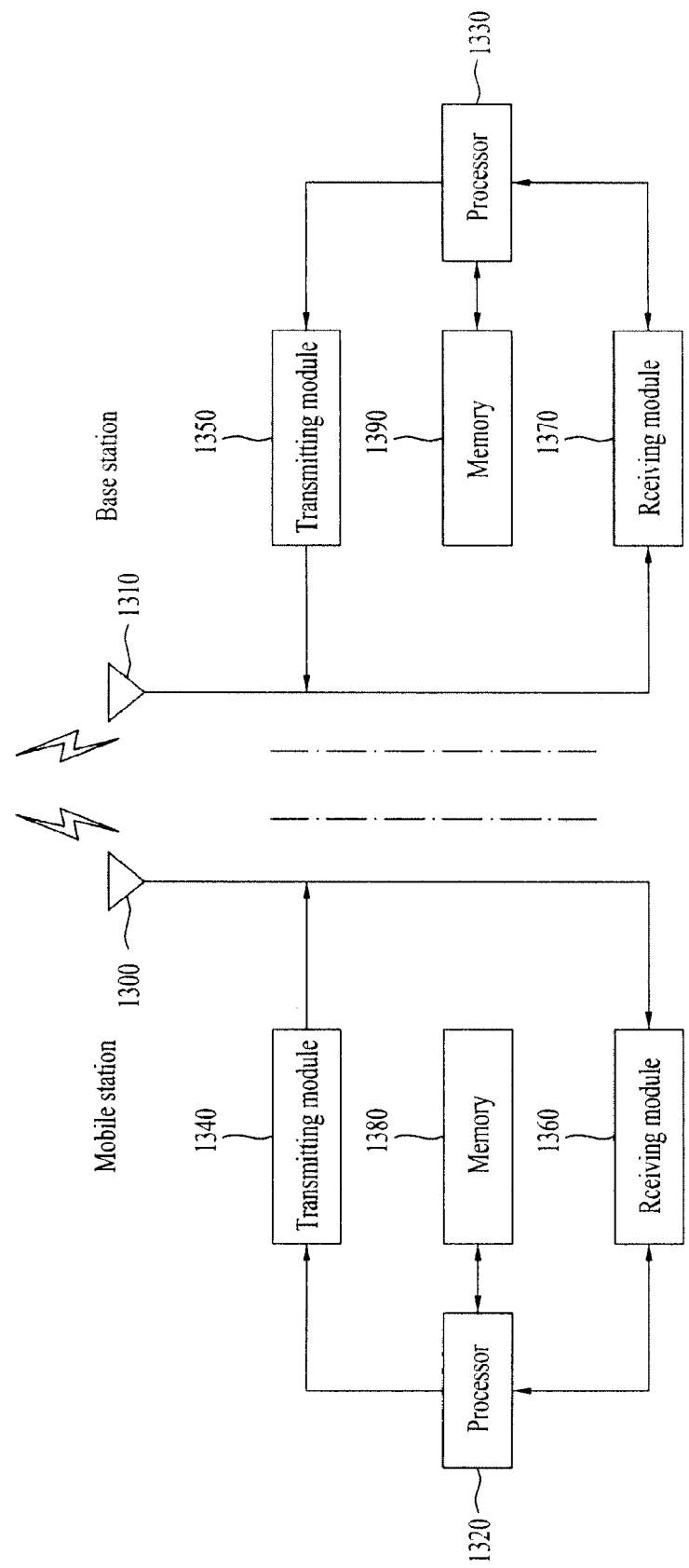
FIG. 13 is a diagram of a mobile station and a base station according to an embodiment of the present invention to implement the embodiments of the present invention described with reference to FIGS. 5 to 12.

FIG. 13 is a diagram of a mobile station and a base station according to an embodiment of the present invention to implement the embodiments of the present invention described with reference to FIGS. 5 to 12.

First of all, a mobile station may operate as a transmitter in uplink or may operate as a receiver in downlink. A base station may operate as a receiver in uplink or may operate as a transmitter in downlink.

In particular, the mobile station may include a transmitting module (Tx module) 1340 and a receiving module (Rx module) 1360 to control transmission and reception of information, data and/or message. The base station may include a transmitting module (Tx module) 1350 and a receiving module (Rx module) 1370 to control transmission and reception of information, data and/or message. The mobile and base stations can include antennas 1300 and 1310 to receive information, data and/or messages, respectively. Moreover, the mobile and base stations can include processors 1320 and 1330 for performing embodiments of the present invention and memories 1380 and 1390 for storing processing procedures of the processors temporarily or permanently, respectively.

The transmitting and receiving modules included in the mobile/base station may perform a packet modulation/demodulation function for data transmission, a fast packet channel coding function, an OFDMA (orthogonal frequency division multiple access) packet scheduling function, a TDD (time division duplex) packet scheduling function and/or a channel multiplexing function.

Moreover, the processor of the base station may be able to determine a size of CIF, as shown in FIG. 10, based on DL CC and UL CC managed by the base station. For instance, in accordance with a maximum number of component carriers possibly allocated to the mobile station, the base station may be able to determine the size of the CIF. Of course, it may be able to determine the size of the CIF with the maximum number of component carriers supportable in a corresponding wireless access system. Moreover, the processor of the base station may control the transmitting module to transmit the PDCCH including the CIF and PDSCH to the mobile station by the signal processing described with reference to FIG. 11.

The processor of the mobile station may be able to control the receiving module to receive the PDSCH on the DL CC indicated by the CIF. For instance, in case of DL scheduling, the processor of the mobile station may control the receiving module to detect a PDCCH candidate in a search space by blind decoding [cf. FIGS. 6 to 8] and may be aware of the DL CC carrying the PDSCH by obtaining the CIF included in the detected PDCCH. Therefore, the mobile station may be able to receive the PDSCH on the corresponding DL CC.

In case of UL scheduling, the mobile station may control the receiving module to detect a PDCCH candidate in a search space by blind decoding [cf. FIGS. 6 to 8] and may be aware of the UL CC to carry PUSCH by obtaining the CIF included in the detected PDCCH. Therefore, the mobile station may be able to transmit a PUSCH signal to the base station on the corresponding UL CC.

Meanwhile, in the present invention, a mobile station may include one of a personal digital assistant (PDA), a cellular phone, a personal communication service (PCS) phone, a GSM (global system for mobile) phone, a WCDMA (wideband CDMA) phone, an MBS (mobile broadband system) phone, a hand-held PC, a notebook PC, a smart phone, a MM-MB (multimode-multiband) terminal and the like.

In this case, the smart phone is a terminal provided with advantages of a mobile communication terminal and a PDA. The smart phone may mean a terminal in which a schedule management function of a PDA, data communication functions of fax transmission/reception, internet access, etc. are integrated on a mobile communication terminal. And, a multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is saved in a memory unit 1380/1390 and is then drivable by a processor 1320/1330. The memory unit may be provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention may be applicable to various wireless access systems. And, 3GPP (3rd generation partnership project), 3GPP2 and/or IEEE 802.xx (institute of electrical and electronic engineers 802) system and the like are examples for the various wireless access systems. Embodiments of the present invention may be applicable to all technical fields having the various wireless access systems applied thereto as well as the various wireless access systems.

What is claimed is:

1. A method of transmitting a signal by a user equipment (UE) configured with a plurality of carriers, the method comprising:
    receiving, through a first carrier among the plurality of carriers, downlink control information (DCI) including carrier indication information;
    transmitting a physical uplink shared channel (PUSCH) signal to a base station through a second carrier indicated by the carrier indication information;
    receiving, in response to the PUSCH signal, hybrid automatic repeat request (HARQ) information for the PUSCH signal only through the first carrier other than the second carrier; and
    retransmitting the PUSCH signal based on the HARQ information being configured to indicate the retransmission of the PUSCH signal,
    wherein a size of carrier indication information of the DCI is a number of bits based on a number of component carriers capable of performing carrier aggregation.

2. The method of claim 1, wherein the DCI for the second carrier is not received through the second carrier.

3. The method of claim 1, wherein a position of the carrier indication information is fixed within the DCI regardless of a DCI format of the DCI.

4. The method of claim 1, wherein the DCI begins with the carrier indication information.

5. The method of claim 1, wherein a size of carrier indication information of the DCI satisfies $\lceil \log_2 M \rceil$-bit, where 'M' denotes a maximum number of carriers for carrier aggregation, '$\lceil \ \rceil$' denotes a ceiling function.

6. A non-transitory computer readable medium recorded thereon a program code for executing the method of claim 1.

7. A user equipment (UE) configured with a plurality of carriers, the UE comprising:
    a transceiver; and
    a processor configured to control the transceiver to:
    receive, through a first carrier among the plurality of carriers, downlink control information (DCI) including carrier indication information;
    transmit a physical uplink shared channel (PUSCH) signal to a base station through a second carrier indicated by the carrier indication information;
    receive, in response to the PUSCH signal, hybrid automatic repeat request (HARQ) information for the PUSCH signal only through the first carrier other than the second carrier; and
    retransmit the PUSCH signal based on the HARQ information being configured to indicate the retransmission of the PUSCH signal,
    wherein a size of carrier indication information of the DCI is a number of bits based on a number of component carriers capable of performing carrier aggregation.

8. A method of receiving a signal by a base station (BS) operating a plurality of carriers, the method comprising:
    transmitting, to a user equipment (UE) through a first carrier among the plurality of carriers, downlink control information (DCI) including carrier indication information;
    receiving, from the UE through the second carrier indicated by the carrier indication information, a physical uplink shared channel (PUSCH) signal;
    transmitting, in response to the PUSCH signal, hybrid automatic repeat request (HARQ) information for the PUSCH signal only through the first carrier other than the second carrier; and
    receiving a retransmission of the PUSCH signal based on the HARQ information being configured to indicate the retransmission of the PUSCH signal,
    wherein a size of carrier indication information of the DCI is a number of bits based on a number of component carriers capable of performing carrier aggregation.

9. The method of claim 8, wherein the DCI is not transmitted through the second carrier.

10. The method of claim 8, wherein a position of the carrier indication information is fixed within the DCI regardless of a DCI format of the DCI.

11. The method of claim 8, wherein the DCI begins with the carrier indication information.

12. The method of claim 8, wherein a size of carrier indication information of the UL grant-DCI satisfies $\lceil \log_2 M \rceil$-bit, where 'M' denotes a maximum number of carriers for carrier aggregation, '$\lceil \ \rceil$' denotes a ceiling function.

13. The method of claim 8, further comprising:
    receiving, through the second carrier, the PUSCH signal that is retransmitted by the UE based on the HARQ information.

14. A base station (BS) operating a plurality of carriers, the BS comprising:
    a transceiver; and
    a processor configured to control the transceiver to:
    transmit, to a user equipment (UE) through a first carrier among the plurality of carriers, downlink control information (DCI) including carrier indication information;
    receive, from the UE through the second carrier indicated by the carrier indication information, a physical uplink shared channel (PUSCH) signal;

transmit, in response to the PUSCH signal, hybrid automatic repeat request (HARQ) information for the PUSCH signal only through the first carrier other than the second carrier; and receive a retransmission of the PUSCH signal based on the HARQ information being configured to indicate the retransmission of the PUSCH signal, wherein a size of carrier indication information of the DCI is a number of bits based on a number of component carriers capable of performing carrier aggregation.

* * * * *